May 5, 1925.
C. F. LAGANKE
1,536,506
WINDSHIELD CLEANER
Filed April 11, 1921    3 Sheets-Sheet 1
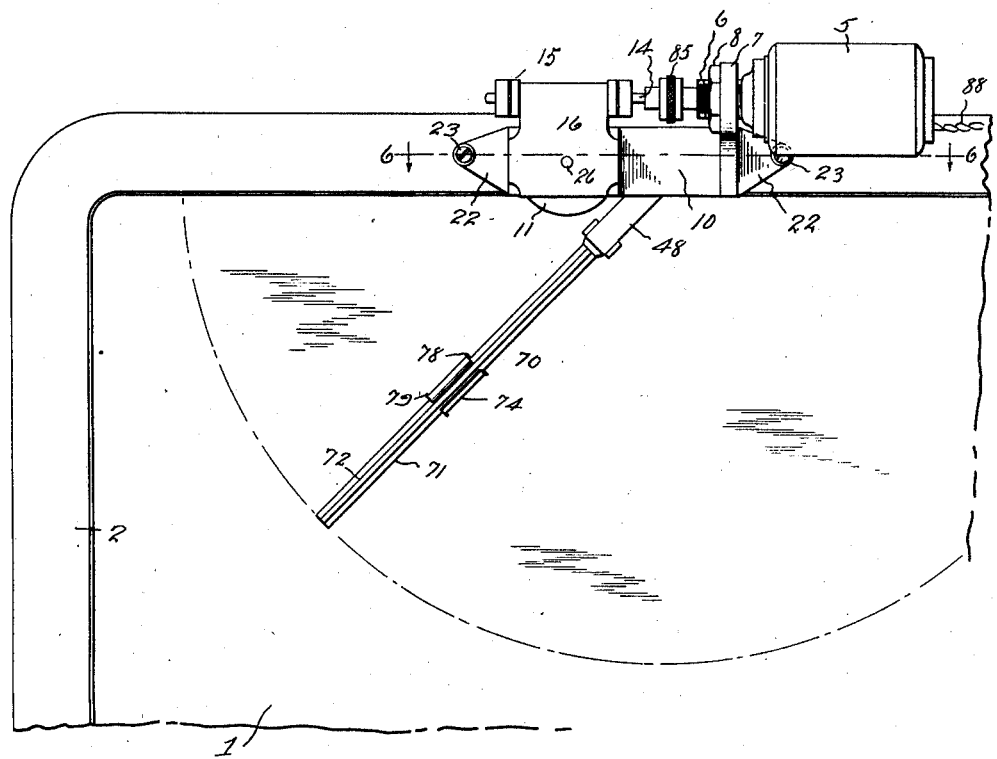
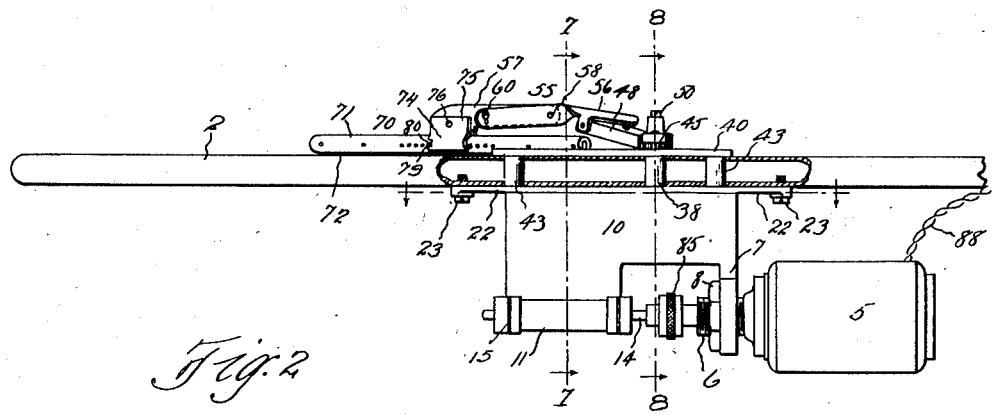

May 5, 1925.
C. F. LAGANKE
WINDSHIELD CLEANER
Filed April 11, 1921
1,536,506
3 Sheets-Sheet 2
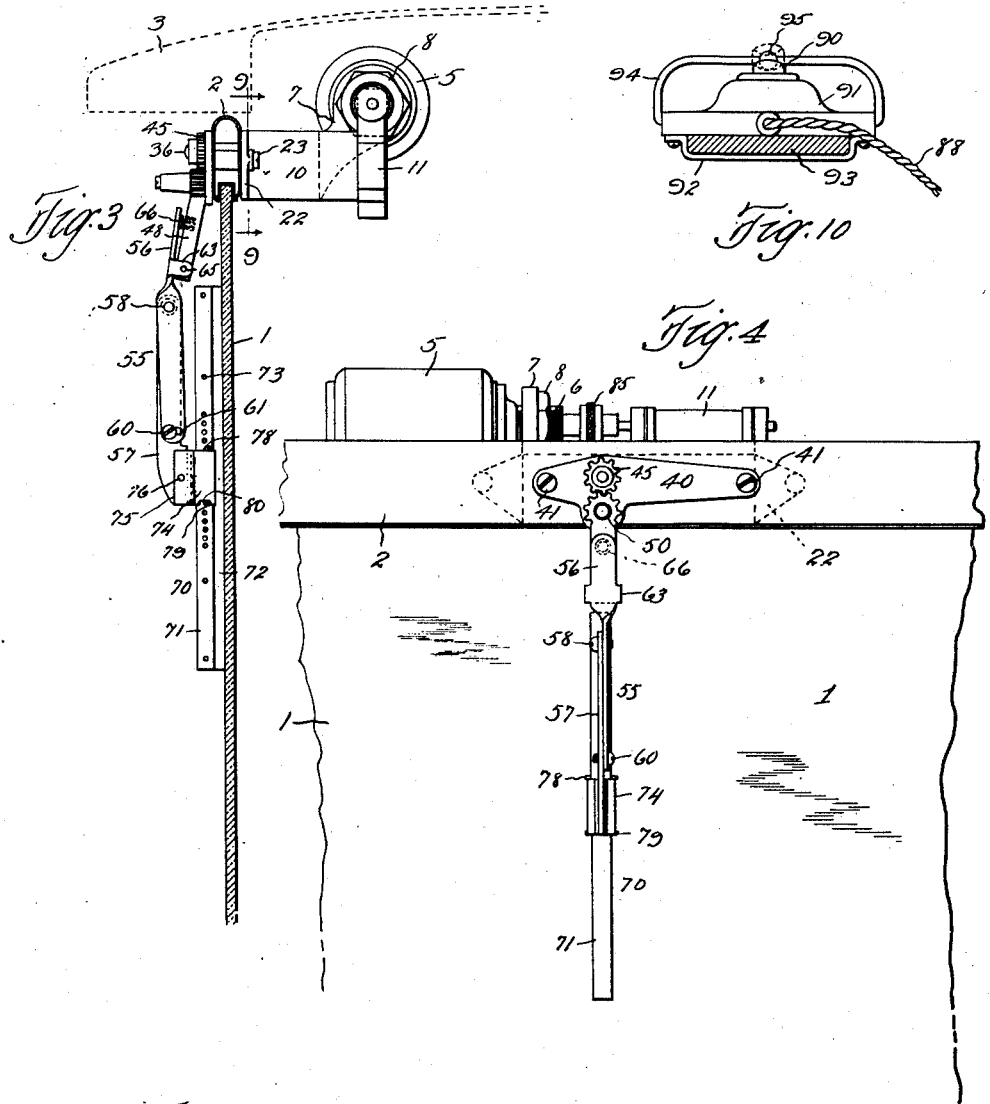
Inventor
Charles F. Laganke
By Hull, Brock & West
Attys.

May 5, 1925.
C. F. LAGANKE
WINDSHIELD CLEANER
Filed April 11, 1921   3 Sheets-Sheet 3
1,536,506
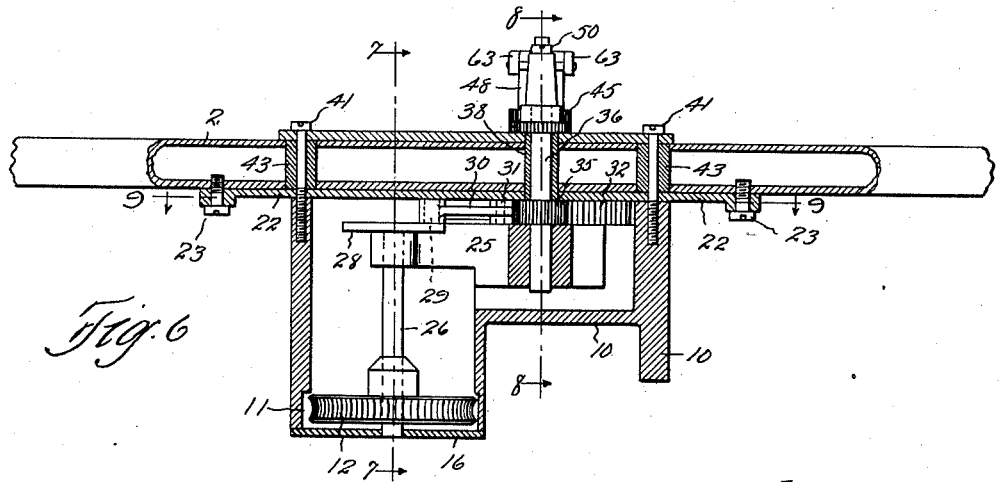
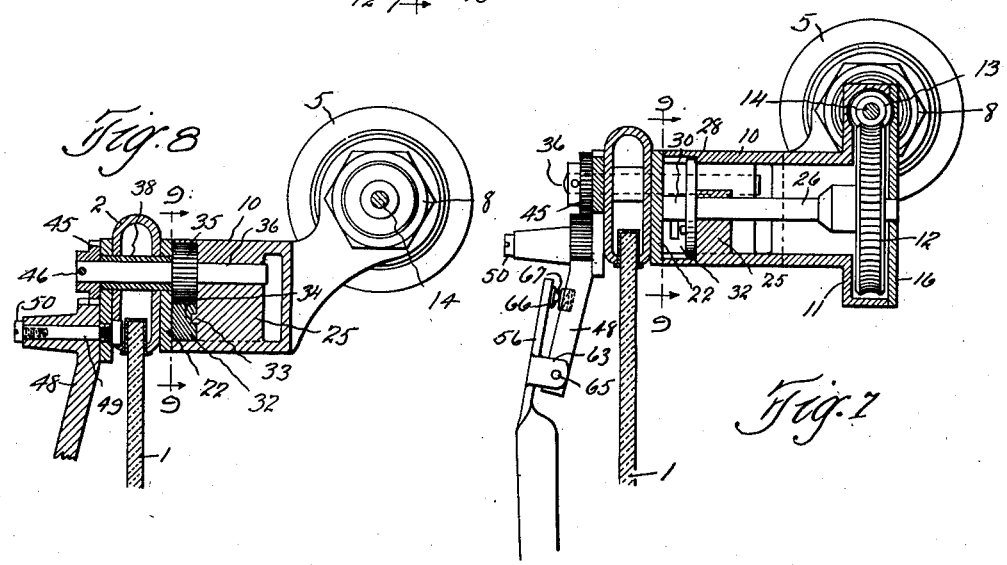
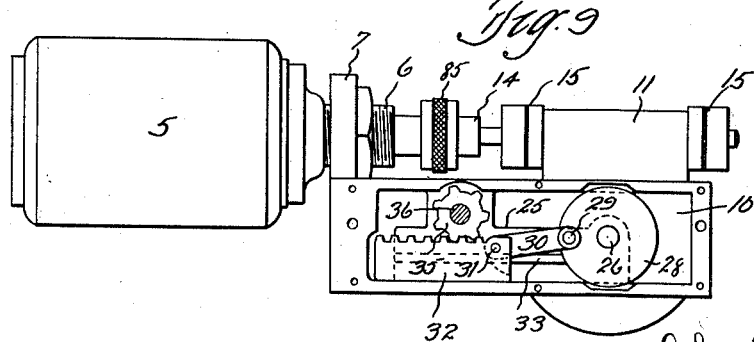
Inventor
By Charles F. Laganke
Hull, Brock & West
Attys.

Patented May 5, 1925.

1,536,506

UNITED STATES PATENT OFFICE.

CHARLES F. LAGANKE, OF EAST CLEVELAND, OHIO, ASSIGNOR TO THE OUTLOOK COMPANY, OF CLEVELAND, OHIO, A CORPORATION OF OHIO.

WINDSHIELD CLEANER.

Application filed April 11, 1921. Serial No. 460,382.

*To all whom it may concern:*

Be it known that I, CHARLES F. LAGANKE, a citizen of the United States, residing at East Cleveland, in the county of Cuyahoga and State of Ohio, have invented a certain new and useful Improvement in Windshield Cleaners, of which the following is a full, clear, and exact description, reference being had to the accompanying drawings.

This invention relates to an improved cleaner, devised especially for use with windshields of automobiles, for removing rain, snow, moisture and other precipitation therefrom, it being understood, however, that the same is adapted for use on motormen's windows of street cars, lookout windows of locomotive cabs, etc.

The general objects of the invention are to provide a strong, durable and compact windshield cleaner that may be easily and rigidly secured to the windshield frame, and which operates smoothly, quietly and automatically.

Another object of the invention is to provide a device of the aforesaid character that is so designed as to be of practically universal adaptability, the same lending itself to various frame and top constructions and bearing such a relation to said parts when mounted upon the frame as not to interfere with the adjustments of the windshield or to be interfered with by the top during such adjustments, or to obstruct the driver's view of the road when the windshield is adjusted to any of its various positions.

A further object comprehended by the invention is the provision of a windshield cleaner incorporating a wiper, an electric motor, and power transmitting mechanism between the motor and wiper and which mechanism is thoroughly enclosed within a leak-proof lubricant-containing casing, whereby practically all parts requiring lubrication will be amply supplied, while those outside the casing are protected from the lubricant and which, if subjected to an accumulation of oil or grease, might smear the windshield, cause deterioration of the rubber or equivalent wiping material of the wiper, or soil the hand of the driver should he have occasion to touch such parts.

Other objects are to provide an electric motor driven windshield cleaner which is economical in the consumption of current; and wherein the power of the motor is transmitted to the wiper through suitable mechanism involving means for manually actuating it thereby to adjust the position of the wiper when such a manual adjustment is desired.

Still further objects of the invention are the provision of a unique wiper carrying arm incorporating means for yieldingly pressing the wiper against the pane of the windshield and involving an adjustment through which various thicknesses of pane and different sizes of frame may be compensated for without affecting the constancy of the pressure of the aforesaid means; and wherein there is a novel form of connection between the wiper and arm through which a lateral oscillation of the wiper with respect to the arm is effected and which greatly enhances the efficiency and ease of action of the wiper.

The foregoing objects, with others which will become apparent as this description proceeds, are attained in the embodiment of the invention illustrated in the drawings accompanying and forming a part hereof, and wherein Fig. 1 is an elevational view of the improved windshield cleaner mounted on a windshield frame and viewed as though looking from the inner side of the windshield; Fig. 2 is a plan view of what is shown in Fig. 1; Fig. 3 shows the device in side elevation, the windshield to which it is attached being in section and the adjacent portion of the automobile top in dotted lines; Fig. 4 is a front elevation; Fig. 5 is a sectional detail on the corresponding numbered line of Fig. 4; Fig. 6 is a horizontal section on the line 6—6 of Fig. 1; Figs. 7 and 8 are transverse sections on the lines 7—7 and 8—8, respectively, of each of Figs. 2 and 6; Fig. 9 is a view looking rearwardly into the casing which houses the principal parts of the transmission mechanism, the view being as though it were a section on the lines 9—9 of Figs. 2, 3, 6, 7, and 8; and Fig. 10 (Sheet No. 2) is a detail of a switch for controlling the motor circuit.

The pane 1 of the windshield is mounted in a frame 2, which is overhung by the forward part of the top 3, as indicated in Fig. 3.

5 is an electric motor having a hollow externally threaded boss 6 that is screwed through an aperture in a bracket 7 and held therein against turning, as by means of a lock nut 8, the bracket 7 being shown as an integral part of a box-like casing 10. This casing has an offset and vertically enlarged portion 11 which houses a worm wheel 12 that meshes with a worm 13, secured to the motor shaft 14, said shaft being journaled within the aforesaid boss and within supporting and thrust bearings 15. A removable plate 16 closes the enlargement 11 of the casing, and by its removal, access may be had to the worm and worm wheel.

At this point in the description attention may be called to the relative positions of the motor 5 and casing 10. It will be seen from Figs. 1, 3, 4, 7, and 8 that the motor is entirely above the bottom plane of the casing 10, and that the casing is above the bottom edge of the frame member to which it is attached; and with the parts so positioned, they will not obstruct the driver's view, nor will the motor interfere with the top 3.

The open front of the casing 10 has secured to it a plate 22 that is shown as extending beyond the ends of the casing and as arranged for attachment to the inner side of the frame by screws 23. Extending longitudinally of and within the casing 10, and parallel to the plate 22, is a wall 25. A shaft 26, to which the aforesaid worm wheel 12 is fastened, and which has its inner end journaled within an aperture in the aforesaid plate 16, has its forward end journaled within the wall 25, and forwardly of the wall has secured to it a disk 28 that carries a crank pin 29 whereon is journaled one end of a pitman 30, the opposite end of the pitman having pivotal connection at 31 with a rack 32 that is reciprocable along a guide 33, projecting from the forward face of the wall 25, which guide is in the form of a tongue that is received by a groove 34 in the rear face of the rack 32 (Fig. 8). The rack may bear on the bottom wall of the casing 10 and have a sliding fit between the wall 25 and the plate 22. The rack meshes with a pinion 35 that is fastened to a shaft 36, the rear end whereof is journaled in an enlargement of the wall 25, while the forward end of the shaft projects through a bearing sleeve 38 that extends through an aperture in the frame member 2. The sleeve 38 has its rear end fitted within an aperture of the plate 22, and its forward end inserted within an aperture in a face plate 40 that is applied to the outer side of the frame member and is secured in place by screws 41 which extend through the face plate and through tubular spacers 43 that are fitted within holes in the frame member and are confined between the face plate and the plate 22, the screws 41 being threaded into the end walls of the casing 10 thereby to clamp the parts firmly together. The spacers 43 prevent any possible deformation of the frame member or plates 30 and 22 which, if permitted, might cause a binding of the shaft 36 within its bearings. A pinion 45 is secured, as by a pin 46, to the forward end of the shaft 36, and this pinion meshes with a segment of a gear shown as formed integral with an arm carrying member 48 that is journaled upon a stud 49 that projects forwardly from the face plate 40, the arm supporting member having an elongated hub portion to afford it proper bearing upon the stud. The member is restrained against withdrawal from the stud by means of a screw 50 that is threaded into the outer end of the stud.

55 is a wiper carrying arm that is made up of sections 56 and 57, pivotally connected together by means of a pin 58, so that the sections are susceptible to an adjustment with respect to each other in a plane perpendicular to that of the pane 1. A screw 60 passes through an opening or slot 61 in the lower end of the arm section 56 and is threaded into the section 57 so that by tightening the screw the arm sections may be clamped together in any relative position to which they are adjusted. It will be seen that the sections 56 and 57 are formed of flat members disposed edgewise with respect to the pane so that they are comparatively narrow and accordingly will not interfere with the driver's vision. Immediately above the pivotal connection of the arm sections, the section designated 56 is twisted through substantially 90 degrees. Ears 63, which project rearwardly from section 56 are disposed on opposite sides of the free end of the arm carrying member 48 for pivotal connection with said member through a pin 65. A spring 66 is compressed between the upper end of the arm section 56 and the adjacent portion of the member 48, said member being recessed for the reception of the inner end of the spring while the outer end of the spring is held against displacement with respect to the arm section by means of a nib 67 (Fig. 7).

A wiper 70, consisting of a back stay 71 in the form of a rod having a groove along one side and a strip 72 of rubber or other wiping material secured within said groove as by means of pins 73, is mounted for lateral oscillation within a socket member 74. This socket member has ears 75 that are engaged on opposite sides of the outer end of arm section 57 and are pivoted thereto by means of a pin 76 in such manner as to permit of a slight rocking of the socket member with respect to the arm. Pins 78 and 79 hold the back stay 71 against longitudinal movement within the socket member, the latter pin being confined within a notch 80 of the socket member to limit the angular movement of the wiper with respect to the socket. A series of holes 81 are provided in the back stay for the pins 78 and 79 whereby the wiper may be adjusted longitudinally with respect to the arm. The spring 66 tends to swing the lower end of the sectional arm inwardly toward the pane and maintain the wiper with the desired degree of pressure against the pane, the adjustment between the arm sections being provided to take care of various thicknesses of pane, different sizes of frame member and wear of the wiper strip, so that under all circumstances the pressure imparted to the wiper by the spring 66 may be the same.

A small hand wheel 85 is secured to the motor shaft where the latter is exposed beyond the end of the boss 6, and by means of this readily accessible hand wheel the operator may manually adjust the position of the wiper 70 at will. This may be found desirable when the motor is stopped with the wiper in any but either of its extreme or substantially horizontal positions, for it will be readily understood as quite impossible to control the motor accurately enough to make sure that the parts will come to rest with the wiper at the extreme end of its stroke and where it is entirely out of the vision of the driver.

Current is supplied to the motor through a flexible cord 88 that may be carried along the top of the windshield frame and down the side thereof and fitted with a suitable switch in convenient reach of the driver so that he may control the operation of the device in a particularly convenient manner, it being intended that the switch should be mounted on the steering wheel of the automobile.

A switch, peculiarly suited for the purpose, is illustrated in Fig 10 (Sheet No. 2). It is of the "push button" variety, the button being designated 90 and the switch casing 91. The casing is shown as clamped, as by means of a clip 92, to a spoke 93 of the steering wheel. A yoke 94 has its ends journaled in the sides of the casing and is adapted to be swung over and into engagement with the button to hold it depressed. The yoke is provided with an enlargement 95 which interlocks within a depression in the button to prevent displacement. When it is desired not to have the cleaner in continuous operation, as when it is raining or snowing only slightly, the button 90 may be depressed occasionally to close the circuit long enough to swing the wiper across the windshield a time or two, but when a continuous operation is made necessary by heavy rain or snow, the button may be held depressed and the circuit thereby maintained closed by engaging the yoke 94 over the button, as illustrated in the drawing.

The operation of the device is obvious from the foregoing description although it may be briefly explained that when the motor is in operation, the worm wheel 12 will be rotated at a proper speed through reduction afforded by the worm 13 and the rotation thereof will be transmitted through shaft 26, crank disk 28, pitman 30, rack 32, pinion 35, shaft 36, and pinion 45, to the wiper carrying arm.

All the parts which require considerable lubrication are contained within the casing 10, and this casing, being practically leakproof, may be packed with grease or supplied with oil.

Having thus described my invention, what I claim is:—

1. In a device of the character set forth, the combination of a casing designed to be attached to the inner side of a windshield frame, a motor supported by and exteriorly of the casing, a wiper supported on the outer side of the windshield in cleaning relation thereto, transmission mechanism within the casing, driving connections between the motor and said mechanism, said connections involving means for manually actuating said mechanism, and operative connections between the mechanism and the wiper.

2. In a device of the character set forth, the combination of a casing designed to be secured to the frame of a windshield, a bracket extending rearwardly and upwardly from the casing, a motor having a boss through which the motor shaft projects, said boss being attached to the aforesaid bracket, a wiper supported in cleaning contact with the outer side of the windshield, transmission mechanism in the casing, and operative connections between the motor shaft and the mechanism.

3. In a device of the character set forth, the combination of a casing designed for attachment to a windshield frame, transmission mechanism within the casing, a motor supported by the casing, connections between said motor and the transmission mechanism, a portion of the motor shaft being exposed, means applied to the exposed portion of the motor shaft for manually rotating it, a wiper sustained in wiping engagement with the windshield pane, and operative connections between the wiper and the transmission mechanism.

4. In a device of the character set forth, the combination of a casing designed for attachment to the inner side of the top member of a windshield frame in such position as not to project to any appreciable extent below said member, transmission mechanism within the casing, a motor supported by the casing and spaced rearwardly of and above the same, operative connections between the motor and the transmission mechanism, a wiper sustained in wiping engagement with the windshield pane, and operative connections between the wiper arm and the transmission mechanism within the casing.

5. In a device of the character set forth, the combination of a lubricant-containing box-like casing designed for attachment to the inner side of a windshield frame, transmission mechanism within the casing, a motor supported by and exteriorly of the casing and having operative connection with the transmission mechanism, and a wiper supported in cleaning relation to the outer side of the windshield and having operative connection with the transmission mechanism.

6. In a device of the character set forth, the combination of an arm supporting member, means pivotally supporting it from the windshield frame, means for oscillating said member, a wiper arm pivoted to the arm supporting member so as to swing toward and from the windshield pane, said wiper arm comprising two sections, means for securing said sections together in various adjusted positions, means tending to swing the arm toward the windshield pane, and a wiper carried by the arm and held thereby in cleaning contact with the pane of the windshield.

7. In a windshield cleaner, the combination of an arm supporting member, a mounting attached to the windshield frame and whereon said member is pivotally supported, means for oscillating said member, a wiper arm made up of two sections that are pivotally connected together, means for securing the sections together in various adjusted positions with respect to each other, one of the sections having pivotal connection with the arm supporting member so as to swing toward and from the windshield pane, means tending to swing the arm toward the windshield pane, and a wiper carried by the free end of the arm and held thereby in cleaning contact with the windshield pane.

8. In a device of the character set forth, the combination with a mounting designed for attachment to a windshield frame, an arm carrying member pivoted to the mounting, means for oscillating said member, an inner arm section pivoted intermediate its ends to the arm supporting member, a spring interposed between one end of the said section and the arm support for urging the opposite end of the arm section toward the windshield, an outer arm section pivoted to the inner section adjacent the latter's pivotal connection with the arm supporting member, the arm sections lying alongside each other, one of said arm sections having an opening, a screw passing through said opening and threaded into the other arm section, the opening being of sufficient size to permit of an adjustment between the arm sections, the screw serving to hold the sections in adjusted position, and a wiper carried by the arm and maintained thereby in cleaning engagement with the pane of the windshield.

9. In a device of the character set forth, the combination of an arm, means supporting the arm in operative relation to the windshield, a socket member pivotally connected to the outer end of the arm, the socket whereof is cylindrical and having its axis substantially parallel to the plane of the windshield pane, a wiper comprising a cylindrical back stay grooved along one side, and a strip of wiping material confined within said groove and projecting beyond the stay for wiping contact with the windshield pane, the back stay being journaled within the socket member, and means maintaining the stay against longitudinal displacement with respect to the socket member and for limiting its angular movement within the socket.

10. In a device of the character set forth, the combination of an arm, means supporting the arm in operative relation to the windshield, a socket member pivotally connected to the outer end of the arm, the socket whereof is cylindrical and having its axis substantially parallel to the plane of the windshield pane, a wiper having a cylindrical portion journaled in and adjustable longitudinally of the socket member, and means for maintaining the back stay in any longitudinally adjusted position with respect to the socket member.

In testimony whereof, I hereunto affix my signature.

CHARLES F. LAGANKE